Dec. 11, 1951          F. B. DOYLE          2,578,179
CONTROLLING DEVICE FOR FOOD PROCESSING APPARATUS
Filed Aug. 8, 1947          2 SHEETS—SHEET 1

INVENTOR
Frank B. Doyle.
BY
HIS ATTORNEY.

Dec. 11, 1951      F. B. DOYLE      2,578,179
CONTROLLING DEVICE FOR FOOD PROCESSING APPARATUS
Filed Aug. 8, 1947      2 SHEETS—SHEET 2

INVENTOR
Frank B. Doyle.
BY
HIS ATTORNEY.

Patented Dec. 11, 1951

2,578,179

UNITED STATES PATENT OFFICE 2,578,179

CONTROLLING DEVICE FOR FOOD PROCESSING APPARATUS

Frank B. Doyle, Trenton, N. J., assignor to Ingersoll-Rand Company, New York, N. Y., a corporation of New Jersey Application August 8, 1947, Serial No. 767,479

7 Claims. (Cl. 99—240)

This invention relates to food processing apparatus, and more particularly to a controlling device for apparatus of that type.

One object of the invention is to assure uniformity of treatment of the food in the various processing zones of the apparatus.

Another object is to expedite the processing of the food and thereby increase the output of the apparatus.

Further objects will be in part obvious and in part pointed out hereinafter.

Figure 1:
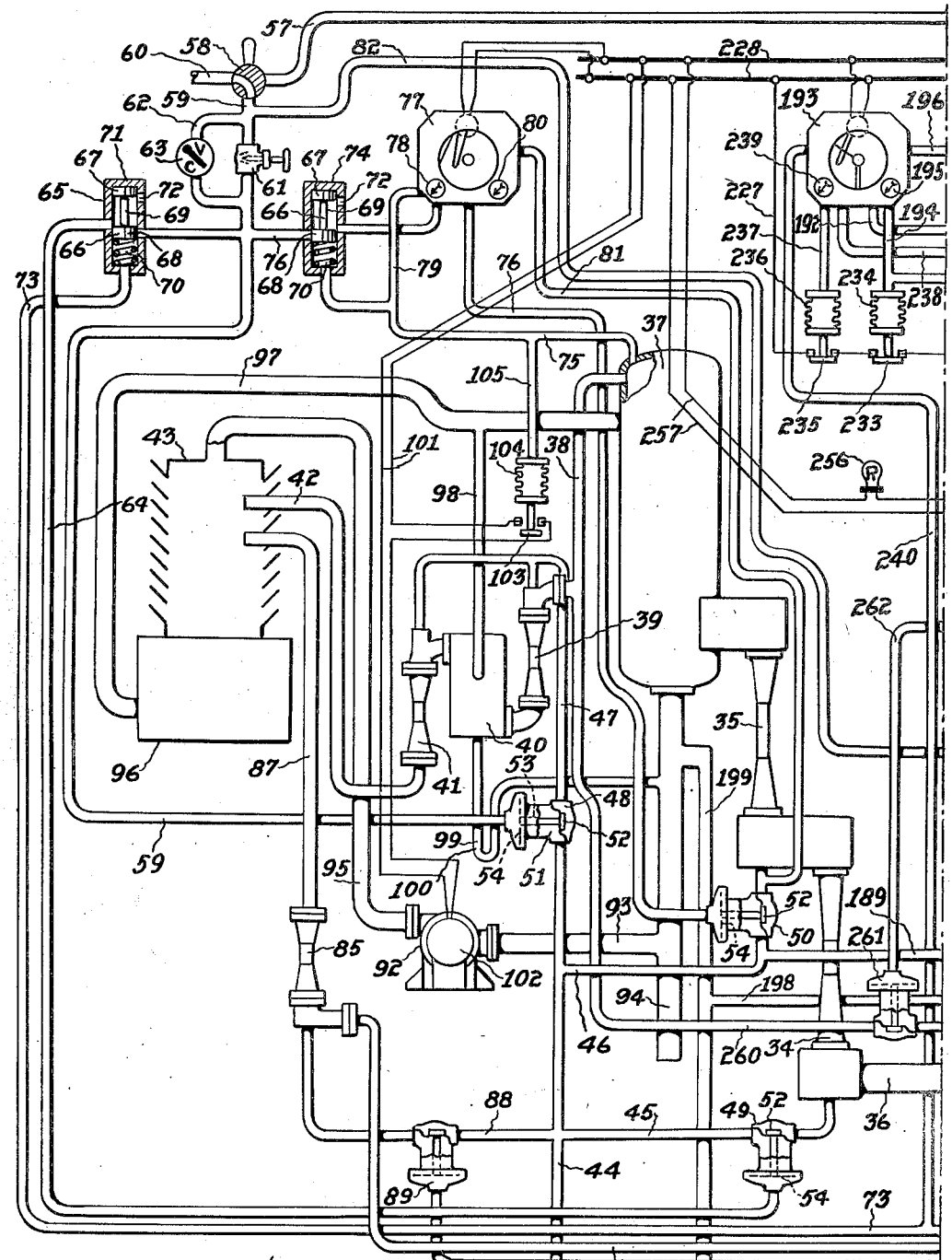
Figure 2:
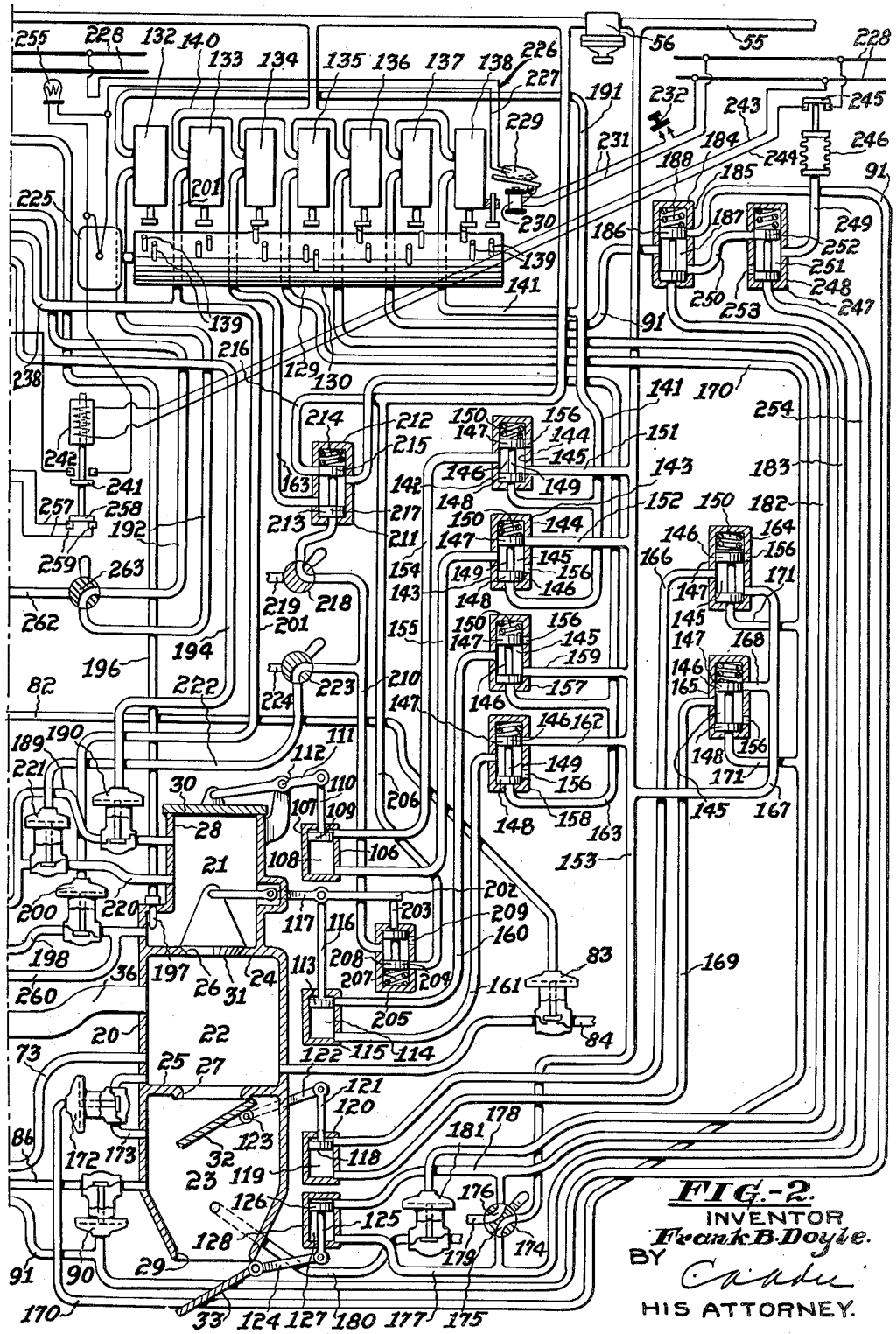

Figures 1 and 2 of the drawings accompanying this specification are portions of a diagrammatic view of the controlling device constructed in accordance with the practice of the invention and a food processing apparatus to which it is applied.

Referring more particularly to the drawings, 20 designates the casing of a food processing apparatus of the type forming the subject matter of U. S. Patent No. 2,407,482 granted to me September 10, 1946. The interior of the casing 20 is accordingly divided into a blanching chamber 21 wherein the food is successively blanched and pre-cooled, a freezing chamber 22 wherein the food is subjected to a high vacuum for freezing it, and a storage chamber 23 from which the frozen food is withdrawn for transportation or final storage.

The walls 24 and 25 dividing the chambers 21 and 22, and 22—23 respectively, have openings 26 and 27 for the discharge of food, by gravity, from one chamber to the other. The charging opening 28 through which the food is introduced into the blanching chamber is located at the upper end of the casing 20, and at the lower end is a discharge opening 29 for the chamber 23. The openings 28, 26, 27 and 29 are, respectively, provided with closures 30, 31, 32 and 33.

The means serving to create the vacuum in the processing chambers comprises, in the present instance, first and second stage ejectors 34 and 35 arranged in tandem, the ejector 34 being connected with the chamber 22 by a conduit 36 and the ejector 35 discharging into the lower portion of a barometric condenser 37. The upper portion of the condenser 37 is connected, by a conduit 38, with a third stage ejector 39 that discharges into an inter-condenser 40, and the uncondensible gases are withdrawn from the inter-condenser by a fourth stage ejector 41, the discharge conduit 42 of which opens into a cooling tower 43.

Steam, for operating the ejectors, is conveyed thereto from a suitable source by a conduit 44 having branches 45 and 46 that lead to the ejectors 34—35, respectively, and a branch 47 that conveys steam to the ejectors 39 and 41. The branches 47, 45 and 46 are, respectively, controlled by valve mechanisms 48, 49 and 50 which normally tend to remain closed to preclude the flow of steam from the conduit 44 to the ejectors and are actuated to their open positions by pressure fluid.

The valve mechanisms are of the well known diaphragm type each comprising a casing 51 and a spring-pressed valve element 52 therein for controlling the flow of steam through the casing. The valve element 52 has a stem 53 suitably connected to a diaphragm 54 against which the pressure fluid, compressed air for example, acts for unseating the valve element. Such pressure fluid, conveyed from a suitable source of supply by a conduit 55, passes through a reducer 56 into a conduit 57 having a valve 58 of the three way type for manually controlling its flow to the valve mechanisms 48, 49 and 50.

The valve 58 is adjustable to positions for effecting communication between the conduit 57 and a conduit 59 communicating with the valve mechanisms and also between the conduit 59 and a discharge conduit 60 for exhausting fluid from the valve mechanisms to the atmosphere. The conduit 59 leads directly to the valve mechanism 48 and has an adjustable needle valve 61 to delay the return flow of pressure fluid from the valve mechanism 48 to the discharge conduit 60. In order to assure an immediate and unrestricted supply of pressure fluid to said valve mechanism, the conduit 59 has a by-pass 62 around the needle valve 61, and in said by-pass is a check valve 63 that acts to permit the free flow of pressure fluid to the valve mechanism 48 but will prevent its return through the by-pass 62.

Pressure fluid, for operating the valve mechanisms 49 and 50, also passes through the check valve 63 and the needle valve 61 and is conveyed to the valve mechanism 49 by a conduit 64 connected to the conduit 59 at a point between the by-pass 62 and the valve mechanism 48. The conduit 64 is controlled by a valve mechanism 65 that acts in response to the vacuum in the chamber 22 and comprises a valve 66, shown as a spool having heads 67 and 68 connected by a stem 69 around which pressure fluid flows from one branch to the other of the conduit 64.

The valve 66 is held normally in a position to prevent communication between the branches of the conduit 64 by a spring 70 calibrated to yield to a predetermined degree of vacuum in the chamber 22. The casing 71 housing the valve 66 has an atmospheric exhaust port 72 which is controlled by the head 67 and provides an escape for the pressure fluid exhausted from the valve mechanism 49. The end of the casing 71 containing the spring 70 is in constant communication with the freezing chamber 22 through a conduit 73.

The flow of pressure fluid to the valve mechanism 50 of the second stage ejector 35 is likewise controlled by a vacuum responsive valve mechanism designated in its entirety by 74 and similar to the valve mechanism 65, with the exception that its spring 70 is calibrated to yield to a somewhat lower degree of vacuum and the chamber containing it and the valve 66 communicates with the uppermost portion of the barometric condenser 37, through a conduit 75. The conduit 76 wherein the valve mechanism 74 is arranged also extends from the conduit 59 at a point between the valves 61 and 49 and leads to a ratio controller 77 of the type disclosed in U. S. Patent No. 2,272,256 to W. H. Vogt. The pressure fluid flows through the controller 77 and through a continuation of the conduit 76 to the valve mechanism 50, and its passage through the ratio controller is controlled by a suitable element only an indicator 78 of which is shown. Such element acts responsively to the pressure in the barometric condenser 37, wherewith it is in communication through a pipe 79 and the conduit 75, and serves to vary the supply of pressure fluid to the valve mechanism 50 in accordance with variations in the value of the vacuum in the condenser 37.

The pressure recording element of the ratio controller 77, and only the indicator 80 of which is shown, is in communication with the branch conduit 46 on the down-stream side of the ejector 35 through a conduit 81, and a conduit 82 leads from the conduit 59, at a point between the valves 58 and 61, to a valve mechanism 83 interposed in a conduit 84 through which atmospheric air may be introduced into the freezing chamber 22 for breaking the vacuum therein. The valve mechanism 83 differs from the valve mechanisms controlling the steam supply to the ejectors only in that its valve element assumes an open position when unexposed to pressure fluid.

The storage chamber 23 is evacuated by an ejector 85 that communicates with the chamber 23 through a conduit 86 and discharges into the cooling tower through a pipe 87. The steam supply for the ejector 85 is conveyed thereto by a conduit 88 leading from the conduit 44 and controlled by a diaphragm valve 89. Communication between the chamber 23 and the ejector 85 is also controlled by a diaphragm valve 90, in the conduit 86, and pressure fluid is conveyed to and from the valves 89 and 90 by a common conduit 91.

The water utilized by the condensers 37 and 40 is delivered to the cooling tower 43 by a pump 92 the inlet conduit 93 of which is shown connected to the tail pipe 94 of the condenser 37. The discharge conduit 95 of the pump opens into the upper portion of the cooling tower 43, and from the basin 96 of the cooling tower leads a conduit 97 that opens into the upper portion of the condenser 37 and has a branch 98 for supplying water to the inter-condenser 40. A discharge conduit 99 having a U-trap 100 conveys the water from the inter-condenser 40 to the tail pipe 94.

The pump 92 is preferably of the centrifugal type and the electrical circuit 101 of the motor 102 driving it is controlled by a switch 103 actuated by a bellows 104 that is connected to the conduit 75 by a pipe 105. The switch 103 and the bellows 104 are so arranged that the circuit 101 is normally open but the bellows will contract and close the switch 103 for starting the motor 102 when the vacuum in the condenser 37 reaches a certain predetermined value.

The closures for the various openings of the blanching, freezing and storage chambers are operated by fluid actuated devices, that for the closure 30 being designated 106 and comprises a casing 107 the interior of which serves as a chamber 108 for a piston 109 having a stem 110 pivotally connected to an end of a lever 111 which rocks on a pivot 112, supported by the casing 20, and is connected at its opposite end to the closure 30. The closure 31 is likewise actuated by a piston 113 reciprocable in a chamber 114 of a casing 115 and has its rod 116 pivotally connected to a lever 117 which is itself pivotally connected to the casing 20 and to the closure 31.

In like manner, the closure 32 for the discharge opening 27 is actuated by a piston 118 reciprocable in a chamber 119 of a casing 120. The rod 121 of the piston 118 is pivotally connected to a lever 122 on the closure 32, and the lever 122 rocks upon a pivot 123 supported by the casing 20, and on the closure 33, and which is pivotally connected to the casing 20, is an arm 124 the free end of which is pivotally connected to a rod 125 of a piston 126 reciprocable in a chamber 127 of a casing 128.

The pressure fluid supply for actuating the pistons 109, 113 and 120 for causing opening and closing movements of the associated closures in the correct sequences and time relation with the processing periods in the blanching and freezing chambers is controlled by a time cycle controller 129 of the type disclosed in U. S. Patent No. 2,272,237 to W. J. Brown et al. and which, described only briefly herein, comprises a rotary drum 130 for actuating a series of air relay valve mechanisms designated 132, 133, 134, 135, 136, 137 and 138. These valve mechanisms are arranged in operating relationship with the drum which carries the usual stops 139 for actuating the valve elements, and it is to be understood that said stops may be so arranged on the drum 130 and of such numbers as to cause certain of the relay valves to operate a plurality of times during a complete cycle of rotation of the drum.

A manifold 140, in communication with the conduit 57, conveys pressure fluid to the relay valves, and a conduit 141 connects the relay valve 138 with a pair of valve mechanisms 142 and 143 that respectively control the flow of pressure fluid to and from the upper and lower ends of the chamber 108. The conduit 141 is connected to corresponding ends of the casings 144 of the valve mechanisms 142—143, and the chambers 145 in the casings 144 each contain a valve 146 having a pair of heads 147 and 148 connected by a stem 149, and a spring 150 bears against the head 147 to act in opposition to the pressure of the fluid acting against the head 148.

The pressure fluid controlled by the valve mechanisms 142—143 is conveyed thereto by branches 151 and 152 of a conduit 153 leading from the conduit 55 and is conveyed from the valve mechanisms 143—143 to the upper and lower ends of the chamber 108 by conduits 154 and 155. The branch 151 and the conduit 154 communicate with the valve chamber 145 of the valve mechanism 142 in such a manner that in the normal position of its valve 146 they will be in communication with each other, and pressure fluid will flow directly from supply into the upper end of the chamber 108. In this position of said valve the head 147 will overlie an exhaust port 156 through which the exhaust fluid from the upper end of the chamber 108 may pass to the atmosphere.

The branch 152 and the conduit 155, on the other hand, open into the chamber 145 of the valve mechanism 143 in such wise that, in the normal position of its valve 146, they will be out of communication with each other and the conduit 155 will be in communication with the exhaust port 156 so that the lower end of the chamber 108 will then be open to the atmosphere.

Valve mechanisms 157 and 158, similar to those designated 142—143, control the flow of pressure fluid to and from the upper and lower ends, respectively, of the chamber 114 containing the piston 113 connected to the closure 31. The valve 146 of the valve mechanism 157 is normally held in one end of the chamber 145 by the spring 150 to afford communication between a branch conduit 159 of the conduit 153 and a conduit 160 leading from the valve mechanism 157 to the upper end of the chamber 114 and the head 147 will then blank-off the exhaust port 156.

In the same position of the valve 146 of the valve mechanism 158 the conduit 161 connecting the valve mechanism 158 with the lower end of the chamber 114 is in communication with the exhaust port 156 and the branch 162 leading from the conduit 153 to the valve mechanism 158 is blanked-off by the head 47. The pressure fluid serving to shift the valves 146 of the mechanisms 157—158 against the force of their springs 150 is conveyed to said valve mechanisms by a conduit 163 to act against the free ends of the heads 148 and is valved into the conduit 163, from the manifold 140, by the relay valve 134.

Similar valve mechanisms designated 164 and 165 control the flow of the pressure fluid that actuates the piston 118 for closing and opening the closure 32. Thus, the chamber 145 of the valve mechanism 164 communicates with the upper end of the chamber 119 through a conduit 166 and with the conduit 153 through a conduit 167. The conduits 166 and 167 open into the chamber 145 in such wise that they will be in communication with each other when the valve 146 occupies a position wherein its head 147 overlies the exhaust port 156. Pressure fluid is also conveyed from the conduit 167 into the valve mechanism 165 by a branch 168 and passes therefrom to the lower end of the chamber 119 through a conduit 169. In the normal position of the valve 146 the conduit 169 is in communication with the exhaust port 156 and the branch 168 is blanked-off by the valve head 147.

The pressure fluid actuating the valves 146 of the valve mechanisms 164—165, and which acts against the heads 148, is conveyed to the chambers 145 by a conduit 170 having branches 171 opening into the ends of the chambers 145. The conduit 170 is communicated with the manifold 140 by the relay valve 135 and is extended to a diaphragm valve 172 in a conduit 173 opening at one end into the freezing chamber 22 and at its other end into the chamber 23. The valve element of the valve mechanism 172 normally occupies a closed position and is opened only for equalizing the pressures in the chambers 22 and 23 prior to the opening of the closure 32.

The piston 126 of the closure 33 is actuated by pressure fluid controlled by a manually operable rotary valve 174 in the conduit 153 having a pair of passages 175 and 176 to establish communication between the conduit 153 and conduits 177 and 178 leading respectively to the lower and upper ends of the chamber 127, and to communicate the conduits 177—178 with an exhaust conduit 179.

In order to break the vacuum in the chamber 23 preparatory to the removal of food therefrom, said chamber is provided with a conduit 180 for admitting atmospheric air thereinto. This conduit is controlled by a diaphrgm valve 181 the valve element of which is normally closed and is unseated, for communicating the chamber 23 with the atmosphere, by pressure fluid conveyed thereto by a conduit 182 leading from the relay valve 136.

An additional function of the manually operable valve 174 is to control the operation of the diaphragm valves 89 and 90 for evacuating the chamber 23. To this end the conduit 178 is provided with an extension 183 that opens into the end of a valve mechanism 184 interposed in the conduit 91. The several branches of the conduit 91 are connected at relatively spaced points along the length of the casing 185 of the valve mechanism 184. Communication between such branches is controlled by a spool valve 186 one end of which is subjected to pressure fluid introduced into an end of the chamber 187 containing the spool valve for actuating said valve in one direction, and in the opposite end of the chamber 187 is a spring 188 for actuating the valve in the opposite direction. The branch of the conduit 91 leading from the relay valve 137 is in constant communication with the valve chamber 187 and the other branch is, in the inactive position of the valve 186, covered by the head engaging the spring 188.

The steam used for blanching the food material in the blanching chamber 21 flows thereto through a conduit 189 communicating with the branch 46 and is controlled by a fluid actuated diaphragm valve 190. The valve element of the diaphragm valve 190 normally occupies its closed position and is unseated by pressure fluid valved by the relay valve 132 from a conduit 191 leading from the conduit 141. Owing to this arrangement, the flow of pressure fluid to the relay valve 132 is controlled by the relay valve 138. This is highly desirable since it precludes the chances of releasing steam during the time the blanching chamber is uncovered.

The pressure fluid is conveyed from the relay valve 132 through a conduit 192 connected to a regulator 193 of the type disclosed in U. S. Patent No. 2,361,885 to K. L. Tate et al. and flows from said regulator through a conduit 194 connected to the diaphragm valve 190. Only the indicator 195 of the element controlling communication between the conduits 192—194 is shown, and it is to be understood that such controlling element acts responsively to the blanching chamber temperature which is communicated thereto by a suitable thermo-sensitive system including a tube 196 containing a volatile fluid and having a bulb 197 extending into the blanching chamber 21.

To the end that the blanched food may be pre-cooled prior to its discharge into the freezing chamber 22, the blanching chamber 21 is connected, by means of a conduit 198, with a suitable point in the vacuum system, as for example with the over-flow pipe 199 of the tail pipe 94. The conduit 198 is controlled by a diaphragm valve 200 that is opened, for communicating the blanching chamber 21 with the overflow pipe 199, by pressure fluid conveyed thereto by a conduit 201 leading from the relay valve 133 of the time cycle controller.

Means are also provided to effect the convenient dislodgement of any particles of food that may adhere to the closure 31 after a blanching operation by both jarring the closure 31 repeatedly and by directing jets of steam against the closure. Both of these operations are dependent upon movement of the closure 31 and the lever 117 thereof is accordingly provided with an extension 202 for engagement with a stem 203 on the end of a spool valve 204 slidable in a casing 205 which is connected to a conduit 206 leading from the conduit 57. The valve 204 is normally held in position for engagement with the extension 202 by a spring 207, and in this position of the valve the head 208 at its opposite end blanks-off the conduit 206.

The casing 205 has an atmospheric exhaust port 209 which is normally uncovered and in communication with a conduit 210 leading to a valve mechanism 211 interposed in the conduit 163 the several branches of which are connected at spaced points along the length of the casing 212 of the valve mechanism so that they will be in constant communication with each other in the normal position of the valve 213. The valve 213 is held in this position by a spring 214 and the head 215 of the valve then blanks-off a branch 216 connecting the conduit 206 with the casing 212. The pressure fluid admitted into the casing 212 by the conduit 210 acts against the other head 217 of the valve 213, and in the conduit 210 is a valve 218 for manually controlling the flow of pressure fluid to the valve mechanism 211 and to control communication between said valve mechanism and an exhaust conduit 219.

The jets of steam used for blowing food materials off of the closure 31 enter the blanching chamber 21 from a pipe 220 which communicates with the conduit 189 and is positioned to direct the steam against the said closure when in its open position. The pipe 220 is provided with a fluid actuated diaphragm valve 221 for controlling the steam flow therethrough and pressure fluid is conveyed to the diaphragm valve, for unseating it, by a conduit 222 leading from the conduit 210, and in the conduit 222 is a valve 223 similar to the valve 218 for valving pressure fluid to the diaphragm valve 221 and to communicate said diaphragm valve with an exhaust conduit 224.

The drum 130 of the time cycle controller is driven by an electric motor 225, and contact between the wires 226—227 constituting an electrical circuit therefor, and leading from the main line 228, is controlled by a mercury switch 229 which is tilted by the drum 130 for opening the motor circuit, in the manner explained in said Patent No. 2,272,237, but is tilted to the opposite position by a solenoid 230. The electrical circuit 231 for the solenoid 230 also leads from the line 228 and is controlled by a push button 232.

To the end that rotary movement of the drum 130 will be stopped whenever the temperature in the blanching chamber 21 is of an insufficient value to adequately blanch the food material, as for example during the initial portion of a blanching period, the motor circuit is provided with a switch 233 that is operated by a bellows 234 attached to the conduit 194. The switch 233 and the bellows 234 are so arranged with respect to the motor circuit, the wire 227 in the present instance, that the switch occupies its closed position when the bellows is deflated, and pressure fluid will enter the bellows to extend it for opening the switch only when the controlling element 195 of the regulator 193 acts to valve pressure fluid to the diaphragm valve 190.

Preferably, the motor circuit is provided with a second switch designated 235 for stopping the drum and thereby prevent the dumping of food into the chamber 22 in the event that the absolute pressure within the freezing chamber is inadequate for freezing. The switch 235 is actuated by a bellows 236 which, when deflated holds the switch in the closed position. The conduit 237 conveying pressure fluid to the bellows 236 is connected to the regulator 193, and communication between the conduit 237 and a conduit 238 leading from the conduit 201 is effected by a suitable element in the regulator 193, only the indicator 239 which it actuates being shown. Such element acts in response to the vacuum in the freezing chamber 22 and is in communication therewith through a conduit 240 connected to the conduit 73.

In order to prevent the transference of food from one chamber to the other during such times as the lower closure 33 may be open, the motor circuit is provided with an additional switch 241. This switch is actuated by a solenoid 242 which is connected to the main line 228 by wires 243—244, and in the wire 244 is a switch 245 that is actuated by a bellows 246 and occupies its closed position when said bellows is deflated. The pressure fluid supply for extending the bellows 246 is controlled, in part, by a valve mechanism 247 to the casing 248 of which are connected a pipe 249 leading to the bellows 246 and a pipe 250 communicating with the chamber 187 of the valve mechanism 184.

The chamber 251 in the casing 248 contains a spring-pressed spool valve 252 that is normally held in position by its spring to permit communication between the pipe 249 and a free exhaust port 253 and to cover the pipe 250, and is actuated to its other limiting position, for effecting communication between the pipes 250 and 249, by pressure fluid conveyed to the chamber 251 by a conduit 254 constituting an extension of the conduit 177.

Preferably, the motor circuit is provided with a light bulb 255 to indicate whether the drum 130 is in motion, and a similar signal light is provided to indicate the position of the closure 33 for the storage chamber 23. The latter light, designated 256, is arranged in a circuit 257 connected to the main line 228, and on the switch 241 is a contactor 258 which, when the solenoid 242 is de-energized, engages the contactors 259 of the circuit 257 for closing said circuit.

In order to effect the removal of air from foods that do not require blanching but must, nevertheless, pass through the blanching chamber for delivery to the freezing chamber, the third stage ejector 39 is connected, through a conduit 260, with the conduit 198 at a point between the diaphragm valve 200 and the blanching chamber 21. The conduit 260 is controlled by a diaphragm valve 261 to which pressure fluid is conveyed, for opening it, by a conduit 262 leading from a three-way valve 263 in the conduit 192.

The operation of the device is as follows: Let it be assumed that the drum 130 is in the zero position representing the starting point of a cycle of operation and that in this position a stop 139 will hold the relay valve 134 open to admit pressure fluid to the valve mechanisms 157—158 to hold their valves 146 in the uppermost limiting positions. The upper end of the chamber 114 will then be in communication with the atmosphere and pressure fluid will enter the lower end of said chamber against the piston 113 and move the closure 31 to its closed position.

The valves 146 of the valve mechanisms 164—165, being unexposed to pressure fluid, will then be held in position, by their springs 150, to communicate the lower end of the chamber 119 with the atmosphere and to admit pressure fluid through the conduit 166 into the upper end of said chamber for closing the closure 32. In this position of the drum, moreover, the valves 146 of the valve mechanisms 142—143 will also be held in position by their springs 150 to communicate the lower end of the chamber 108 with the atmosphere and to admit pressure fluid into the upper end of said chamber for holding the closure 30 in the open position.

The blanching chamber 21 will then be in readiness to receive food for processing, and the freezing chamber 22 will be closed for evacuation by the ejectors. The manually operable valve 58 is next rotated to valve pressure fluid from the conduit 57 to the conduit 59. Such pressure fluid, acting against the diaphragm 54 of the valve mechanism 48, will open the valve element 52 and permit the flow of steam to the ejectors 39—41 which will then operate to initiate evacuation of the freezing chamber. At the same time, pressure fluid will flow through the conduit 82 and close the valve 83 to cut-off communication between the chamber 22 and the atmosphere.

When the pressure in the condenser 37 reaches the predetermined value at which the bellows 104 is intended to act, said bellows will contract and shift the switch 103 into contact with the wires of the electrical circuit 101 to start the motor 102. The pump 92 will then circulate water from the tail pipe 94 to the cooling tower 43, whence it is syphoned to the condensers 37—40 through the conduits 97—98 for cooling the uncondensible gases delivered thereto.

When the vacuum reaches the value at which it will overcome the spring 70 of the valve mechanism 74 the valve 66 will move into position to establish communication between the branches of the conduit 76. Pressure fluid will then flow to the diaphragm valve 50 and open the branch 46 to admit steam to the ejector 35. Thereafter, when the vacuum reaches a value sufficient to overcome the force of the spring 70 of the valve mechanism 65 it will shift the valve 66 of said mechanism to communicate the branches of the conduit 64 with each other to admit pressure fluid to the diaphragm valve 49 for valving steam to the first stage ejector. All of the ejectors will then be in operation to bring the vacuum in the freezing chamber 22 to the value required for quick freezing of the food material.

In the event that the power expenditure for evacuation is greater than required for immediate conditions in the freezing chamber the consequent increased vacuum therein will be communicated, through the conduits 79—75, to the element controlling communication between the branches of the conduit 76 connected to the ratio controller 77 and such element will then act to throttle the flow of pressure fluid to the diaphragm valve 50 and thereby decrease the supply of steam to the ejector 35.

When the vacuum in the freezing chamber 22 reaches the correct freezing value a charge of food is placed in the blanching chamber 21 and the push button 232 is pressed to close the electrical circuit 231. The solenoid 230 will then tilt the mercury switch 229 for closing the circuit of the motor 225 to drive the drum 130. Immediately thereafter, a stop 139 will actuate the relay valve 138 and pressure fluid will flow through the conduit 141 to the valve mechanisms 142—143 and shift the valves 140 to communicate the upper end of the chamber 108 with the atmosphere and to valve pressure fluid into the lower end of said chamber against the piston 109 for closing the closure 30.

Simultaneously with the admission of pressure fluid to the valve mechanisms 142—143, pressure fluid flows from the conduit 141 through the conduit 191 to the relay valve 132 and, at the same time, a stop 139 will actuate said relay valve for valving such pressure fluid into the conduit 192. Such pressure fluid will flow through the regulator 193 and the conduit 194 and open the diaphragm valve 190 to admit steam into the chamber 21 for blanching the food. Pressure fluid will then also flow into the bellows 234 and extend it for opening the switch 233 to cut-off the supply of electric current to the motor 225 and to the signal light 255.

The drum 130 remains stationary until the temperature within the chamber 21 reaches a value suitable for blanching and this temperature will be communicated through the tube 196 to the controlling element in the regulator 193 and will cause said element to cut-off the flow of pressure fluid to the conduit 194 and to provide a suitable escape for the pressure fluid in said conduit. The bellows 234 will then contract and close the switch 233 to again start the motor 225. The drum 130 will continue to rotate through a predetermined angle corresponding to the period of time required for blanching the food, and at the expiration of such period a stop 139 will actuate the relay value 132 for cutting-off communication between the conduits 191 and 192.

Simultaneously with this movement of the relay valve 132, a stop 139 will shift the relay valve 133 and pressure fluid will flow from the manifold 140 through the conduit 201 and open the diaphragm valve 200. In this way the blanching chamber 21 will be communicated with the barometric condenser 37 for evacuation to pre-cool the food prior to its delivery to the freezing chamber 22.

During the pre-cooling period pressure fluid also flows through the conduit 238 to the regulator 193 but will be valved into the bellows 236, for opening the switch 235, by the controlling element actuating the indicator 239 only in the event that the vacuum in the freezing chamber is of an insufficient value to effect the correct freezing of food. Otherwise, a stop 139 will actuate the relay valve 134 for cutting-off the flow of pressure fluid into the conduit 163 and the springs 150 of the valve mechanisms 157—158 will shift their valves 146 to open the lower end of the chamber 114 to the atmosphere and to admit pressure fluid into the other end thereof against the piston 113 for opening the closure 31 and thereby permit the food material to drop into the freezing chamber 22.

In the new position of the closure 31 the extension 202 of the lever 117 will depress the valve 204 to communicate the conduit 206 with the conduit 210. Thus, and with the valve 218 in the open position, pressure fluid will flow to the valve mechanism 211 and shift the valve 213 and establish communication between the conduits 216 and 163. The pressure fluid thereby admitted into the valve mechanisms 157—158 will again shift their valves 146 and cause the piston 113 to bump the closure 31 against its seat to loosen any food particles that may cling to the closure.

In the closed position of the closure the valve 204 again cuts off the flow of pressure fluid from the conduit 206 to the valve mechanism 211. The valve 213 will then be shifted, by its spring 214, to also cut-off the flow of pressure fluid to the conduit 163. Thereupon the valves 146 of the mechanisms 157—158 will be shifted, by their springs, to respectively admit pressure fluid into the upper end of the chamber 114 and to communicate the lower end of said chamber with the atmosphere for again opening the closure 31 and to enable the valve 204 to move into position for uncovering the conduit 206. Pressure fluid will then again flow to the valve mechanism 211 for lifting the closure 31, and pressure fluid will also flow through the conduit 222 to open the diaphragm valve 221 for directing a jet of steam against the closure 31 to blow food particles therefrom.

Such jarring of the closure 31 and the admission of jets of steam thereagainst will be repeated throughout a predetermined angle of rotation of the drum 130 and a stop 139 will then again tilt the relay valve 134 to valve pressure fluid through the conduit 163 to the valve mechanisms 157—158. The valves 146 will be shifted thereby and again introduce pressure fluid into the lower end of the chamber 114 against the piston 113 for moving the closure 31 to its closed position and to hold it thus.

Immediately after the final closing of the closure 31 a stop 139 will shift the relay valve 138 to cut-off the further admission of pressure fluid to the valve mechanisms 142—143. The valves 146 thereof will then be shifted by the springs 150 to their initial positions to communicate the lower end of the chamber 108 with the atmosphere and to admit pressure fluid into the upper end of said chamber for lifting the closure 30. Following the opening of said closure, a stop 139 will tilt the mercury switch 229 to open the connection between the wires 226—227 for stopping the motor 225. A new charge of food is then placed in the blanching chamber, and the push button 232 is pressed to again close the circuit 231. Thereafter, the relay valves 138, 132 and 133 are again actuated in the order named to respectively cause the closing of the closure 30, the admission of steam into the blanching chamber and, at the end of the blanching period, to again establish communication between the blanching chamber and the evacuating devices.

The time required for blanching the second charge of food in the chamber 21 is utilized by the attendant for evacuating the chamber 23. This is initiated by manipulation of the valve 174. Thus, assuming the closure 33 to be in the open position, as illustrated, the valve 174 is positioned to establish communication between the supply conduit 153 and the conduit 178 and between the conduit 177 and the exhaust conduit 179. Pressure fluid then flows into the upper end of the chamber 127 against the piston 126 for closing the closure 33.

At the same time pressure fluid will flow through the conduit extension 183 into the chamber 187 of the valve mechanism 184 and shift the valve 186 into position to afford communication between the branches of the conduit 91. Thus, when a stop 139 shifts the relay valve 137 pressure fluid valved thereby will flow through the conduit 91 and open the diaphragm valves 90 and 89 to communicate the storage chamber 23 with the ejector 85 and to permit the flow of steam from the supply conduit 84 to said ejector. Evacuation of the storage chamber 23 will then continue throughout a predetermined angle of rotation of the drum 130, and at the end of such period the relay valve 137 is again actuated, by a stop 139, to cut-off the flow of pressure fluid to the diaphragm valves 89 and 90.

Coincident with the closing of the relay valve 137, a stop 139 will actuate the relay valve 135 and pressure fluid then flows from the manifold 140 through the conduit 170, to open the diaphragm valve 172 for equalizing the pressures in the chambers 22–23, and pressure fluid also flows to the valve mechanisms 164—165 to shift the valves 146 thereof for respectively communicating the upper end of the chamber 119 with the atmosphere and to admit pressure fluid into the lower end of the chamber 119 against the piston 118 for opening the closure 32 to drop the frozen food into the chamber 23.

The closure 32 remains open to permit the dumping of succeeding batches of blanched food directly into the storage chamber 23 for freezing, and at the end of the freezing period of the final batch delivered thereto a stop 139 will again actuate the relay valve 135 for cutting-off the flow of pressure fluid to the conduit 170 and to exhaust the pressure fluid from said conduit. The diaphragm valve 172 will then again assume its closed position, and the valves 146 of the mechanisms 164—165 will be shifted, by their springs 150, to effect the moving of the closure 32 to its closed position. Immediately thereafter, a stop 139 will actuate the relay valve 136 to admit pressure fluid from the manifold into the conduit 182 for unseating the diaphragm valve 181 to establish communication between the chamber 23 and the atmosphere. The relay valve 136 need remain open only until the vacuum in the chamber 23 is broken and is then again shifted to its initial position by a stop 139 to permit the valve element of the diaphragm valve 181 to assume its closed position preparatory to a subsequent evacuation of the storage chamber.

Following the breaking of the vacuum in the chamber 23 the valve 174 is positioned, by the attendant, to effect communication between the supply conduit 153 and the conduit 177 and to communicate the conduit 178 with the exhaust conduit 179. The upper end of the chamber 127 will then be open to the atmosphere and pressure fluid will flow into the lower end of said chamber against the piston 126 to open the closure 33 for discharging the frozen food. The valve mechanism 184 will then also be in communication with the atmosphere through the conduit 183 and the discharge conduit 179, and pressure fluid will flow through the conduit 254 into the valve chamber 251 of the valve mechanism 247 and shift the valve to effect communication between the conduits 250 and 249. Pressure fluid admitted thereby into the bellows 246 will extend it and open the switch 245 and deenergize the solenoid 242. The armature of said solenoid will then descend and open the switch 241 for stopping the motor 225 and also bring the switch 253 into position for closing the circuit 257 in order that the light 256 may indicate that the discharge opening 29 is uncovered.

Whenever it is intended to discontinue the operation of the freezing apparatus and assuming the drum 130 of the time cycle controller to be in the zero position wherein, as has been previously explained, the closures 31 and 32 will be in their closed positions, the valve 58 is rotated to cut-off the conduit 59 from supply and to establish communication between the conduits 59 and 60. Pressure fluid will then escape from the conduit 62 and the diaphragm valve 83 will assume its open position and communicate the freezing chamber 22 with the atmosphere.

Thereafter, when the vacuum reaches a value at which it may be overcome by the spring 70 of the valve mechanism 65 said spring will shift the valve 66 and establish communication between the conduit 64 and the exhaust port 72. The fluid in the conduit 64 will then exhaust to the atmosphere and the diaphragm valve 49 will move to its closed position and cut-off the steam supply to the ejector 34. Upon a further decrease of the vacuum to the value at which the spring 70 of the valve mechanism 74 may overcome the force thereof said spring will shift the valve 66 and establish communication between the exhaust port 72 and the branch of the conduit 76 leading to the diaphragm valve 50 which will then return to its closed position and cut-off the further flow of steam to the ejector 35.

Meanwhile, the pressure fluid in the conduit 59 will escape gradually through the needle valve 61 to the atmosphere and permit the diaphragm valve 48 to move to its closed position for cutting-off the flow of steam to the ejectors 39—41, and when the vacuum again reaches that value at which the bellows 104 may act said bellows will extend itself to open the switch 103 and thereby shut down the pump motor 102.

As will be readily appreciated from the foregoing description, by thus first opening the freezing chamber 22 to the atmosphere and next successively inactivating the ejectors instead of merely cutting-off the steam flow to the ejectors the changes of flooding the freezing chamber with condensing water will be obviated.

Whenever it is intended to process food that does not require blanching, the valve 263 is positioned to communicate the branch of the conduit 192 leading from the relay valve 132 with the conduit 262. Pressure fluid will then flow directly from the relay valve 132 to the diaphragm valve 261 for effecting communication between the blanching chamber 21 and the ejector 39. In this way most of the air will be removed from the food charge by the ejector 39 during the time normally required for blanching, and any remaining air will be withdrawn from the food during the following normal pre-cooling period. That is to say, during the time the relay valve 133 acts to admit pressure fluid to the diaphragm valve 200 for establishing communication between the blanching chamber 21 and the tail pipe overflow 199.

I claim:

1. In a controlling device for food processing apparatus, a casing having a blanching compartment and inlet and outlet openings for the passage of food into and from the compartment, closures for the openings, a fluid actuated valve for controlling the flow of blanching medium into the compartment, a power-driven timing device for controlling the duration of flow of pressure fluid to the valve and thus the duration of flow of blanching medium into the blanching compartment, and a thermosensitive device acting during a blanching period and in response to the temperature in the blanching compartment to cut-off the flow of power to the timing device whenever the temperature in the blanching chamber reaches a predetermined low degree and to supply power to the timing device whenever the temperature in the blanching chamber reaches a predetermined high degree.

2. In a controlling device for food processing apparatus, a casing having a blanching compartment and inlet and outlet openings for the passage of food into and from the compartment, closures for the openings, fluid actuated means for moving the closures to their open and closed positions, a fluid actuated valve for valving blanching medium into the compartment, a power-driven timing device for controlling the duration of flow of pressure fluid to the valve and thus the duration of the flow of blanching medium into the blanching compartment and to control the timed flow of pressure fluid to the fluid actuated means for causing the said fluid actuated means to operate the closures prior to and at the end of a blanching period and a thermosensitive device acting during a blanching period and in response to the temperature in the blanching compartment to cut-off the flow of power to the timing device whenever the temperature in the blanching chamber reaches a predetermined low degree and to supply power to the timing device whenever the temperature in the blanching chamber reaches a predetermined high degree.

3. In a controlling device for food processing apparatus, a casing having a blanching compartment and a freezing compartment and a discharge opening for the passage of food from the blanching compartment into the freezing compartment, a closure for the discharge opening, a seat in the casing for the closure, a piston for opening the closure and for moving said closure forcibly against the seat, means for controlling the flow of pressure fluid to the piston for actuating the piston to cause repeated opening and closing movement of the closure for dislodging food material adhering to the closure, and means connected to and movable with the closure for controlling the last mentioned means.

4. In a controlling device for food processing apparatus, a casing having a blanching compartment and a freezing compartment and a discharge opening for the passage of food from the blanching compartment into the freezing compartment, a closure for the discharge opening, a seat in the casing for the closure, a piston for opening the closure and for bumping the closure against the seat, pressure responsive valve means to control the supply of pressure fluid for actuating the piston, valve means for controlling the flow of pressure fluid to and from the pressure responsive valve means for actuating the piston and thereby cause opening and closing movement of the closure to dislodge food material adhering to the closure, and means connected to and movable with the closure for controlling the second mentioned valve means.

5. In a controlling device for food processing apparatus, a casing having a blanching compartment and a freezing compartment and a discharge opening for the passage of food from the blanching compartment into the freezing compartment, a closure for the discharge opening, fluid actuated means for imparting opening and closing movement to the closure, and means controlled by the closure for injecting puffs of blanching medium into the compartment to dislodge food material adhering to the closure.

6. In a controlling device for food processing apparatus, a casing having a blanching compartment and a freezing compartment and a discharge opening for the passage of food from the blanching compartment into the freezing compartment, a closure for the discharge opening, fluid actuated means for imparting opening and closing movement to the closure, a nozzle for directing blanching medium against the closure for dislodging food material adhering thereto, a fluid actuated valve for controlling the flow of blanching medium through the nozzle, and means acting in response to the movement of the closure for controlling the flow of pressure fluid to and from the valve.

7. In a controlling device for food processing apparatus, a casing having a blanching compartment and a freezing compartment and a discharge opening for the passage of food from the blanching compartment to the freezing compartment, a closure for the discharge opening, means controlled by the closure for causing repeated opening and closing movement of the closure for dislodging food material adhering thereto, and means also controlled by the closure for injecting puffs of blanching medium into the compartment against the closure to blow food material off of the closure.

FRANK B. DOYLE.

REFERENCES CITED

The following references are of record in the file of this patent:

UNITED STATES PATENTS

| Number | Name | Date |
|---|---|---|
| 1,009,400 | Fordyce et al. | Nov. 21, 1911 |
| 1,369,649 | Geiseler | Feb. 22, 1921 |
| 1,404,400 | Moon | Jan. 24, 1922 |
| 1,470,057 | Carter | Oct. 9, 1923 |
| 1,489,109 | Bataille | Apr. 1, 1924 |
| 1,621,620 | Bast | Mar. 22, 1927 |
| 2,138,356 | Ryan et al. | Nov. 29, 1938 |
| 2,145,851 | Asplund | Feb. 7, 1939 |
| 2,245,833 | Smith et al. | June 17, 1941 |
| 2,267,900 | Doyle | Dec. 30, 1941 |
| 2,272,237 | Brown et al. | Feb. 10, 1942 |
| 2,272,256 | Vogt | Feb. 10, 1942 |
| 2,321,235 | Olson | June 8, 1943 |
| 2,361,885 | Tate et al. | Oct. 31, 1944 |
| 2,407,482 | Doyle | Sept. 10, 1946 |